(12) United States Patent
Sugawara (10) Patent No.: US 9,099,925 B2
(45) Date of Patent: Aug. 4, 2015

(54) SWITCHING POWER SUPPLY WITH CIRCUIT TO CONTROL TURN ON TIMING OF SWITCHING ELEMENT

(71) Applicant: FUJI ELECTRIC CO., LTD., Kawasaki (JP)

(72) Inventor: Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 129 days.

(21) Appl. No.: 14/029,546

(22) Filed: Sep. 17, 2013

(65) Prior Publication Data
US 2014/0085949 A1   Mar. 27, 2014

(30) Foreign Application Priority Data

Sep. 25, 2012   (JP) .................................. 2012-211597

(51) Int. Cl.
| | |
|---|---|
| *H02M 1/42* | (2007.01) |
| *H02M 7/12* | (2006.01) |
| *H02M 7/217* | (2006.01) |
| *H02M 1/00* | (2007.01) |

(52) U.S. Cl.
CPC ............ *H02M 7/217* (2013.01); *H02M 1/4225* (2013.01); *H02M 2001/0032* (2013.01); *H02M 2001/0058* (2013.01); *Y02B 70/126* (2013.01); *Y02B 70/1491* (2013.01); *Y02B 70/16* (2013.01)

(58) Field of Classification Search
CPC .............. H02M 7/217; H02M 1/4225; H02M 2001/0058; H02M 2001/0032; H02M 2001/0054; H02M 7/2176; Y02B 70/1491; Y02B 70/126; Y02B 70/16
USPC ...................... 323/205, 207; 363/89
See application file for complete search history.

(56) References Cited

U.S. PATENT DOCUMENTS

| | | | | |
|---|---|---|---|---|
| 4,625,272 | A | * | 11/1986 | Okuyama et al. ................ 363/81 |
| 6,984,963 | B2 | | 1/2006 | Pidutti et al. |
| 7,116,090 | B1 | | 10/2006 | Yang et al. |
| 2013/0043846 | A1 | * | 2/2013 | Murdock et al. .............. 323/205 |
| 2013/0077362 | A1 | * | 3/2013 | Kumar ............................ 363/49 |

OTHER PUBLICATIONS

Fairchild Semiconductor. "Fan 7930 Critical Condcution Mode PFC Controller". Rev. 1.1, Apr. 2010, pp. 1-22.*

* cited by examiner

*Primary Examiner* — Harry Behm
*Assistant Examiner* — Peter Novak (57) ABSTRACT

A switching power supply that conducts switching of an input voltage by a switching element to obtain a specified output voltage includes: an ON width controlling component that controls an ON width of the switching element; a zero current detecting component that detects zero current through the switching element to turn ON the switching element; a frequency reducing component that delays a turn ON timing of the switching element upon detection of a light load condition by a load condition detecting component to reduce a switching frequency of the switching element; and an AC period detecting component that detects a period of the input voltage to hold the load condition detected by the load condition detecting component over every period detected by the AC period detecting component.

6 Claims, 8 Drawing Sheets

SWITCHING POWER SUPPLY WITH CIRCUIT TO CONTROL TURN ON TIMING OF SWITCHING ELEMENT

CROSS-REFERENCE TO RELATED APPLICATIONS

This application is based on, and claims foreign priority benefit to Japanese Patent Application No. 2012-211597, filed on Sep. 25, 2012, in the Japanese Patent Office, the entire disclosure of which is incorporated herein by reference.

BACKGROUND

1. Field

Embodiments of the present invention relate to a switching power supply in which the power factor in the region of small phase angle of the input voltage does not decrease even in the state with a maximum frequency limitation on the switching frequency under a light load condition.

2. Description of the Related Art

Figure 6:
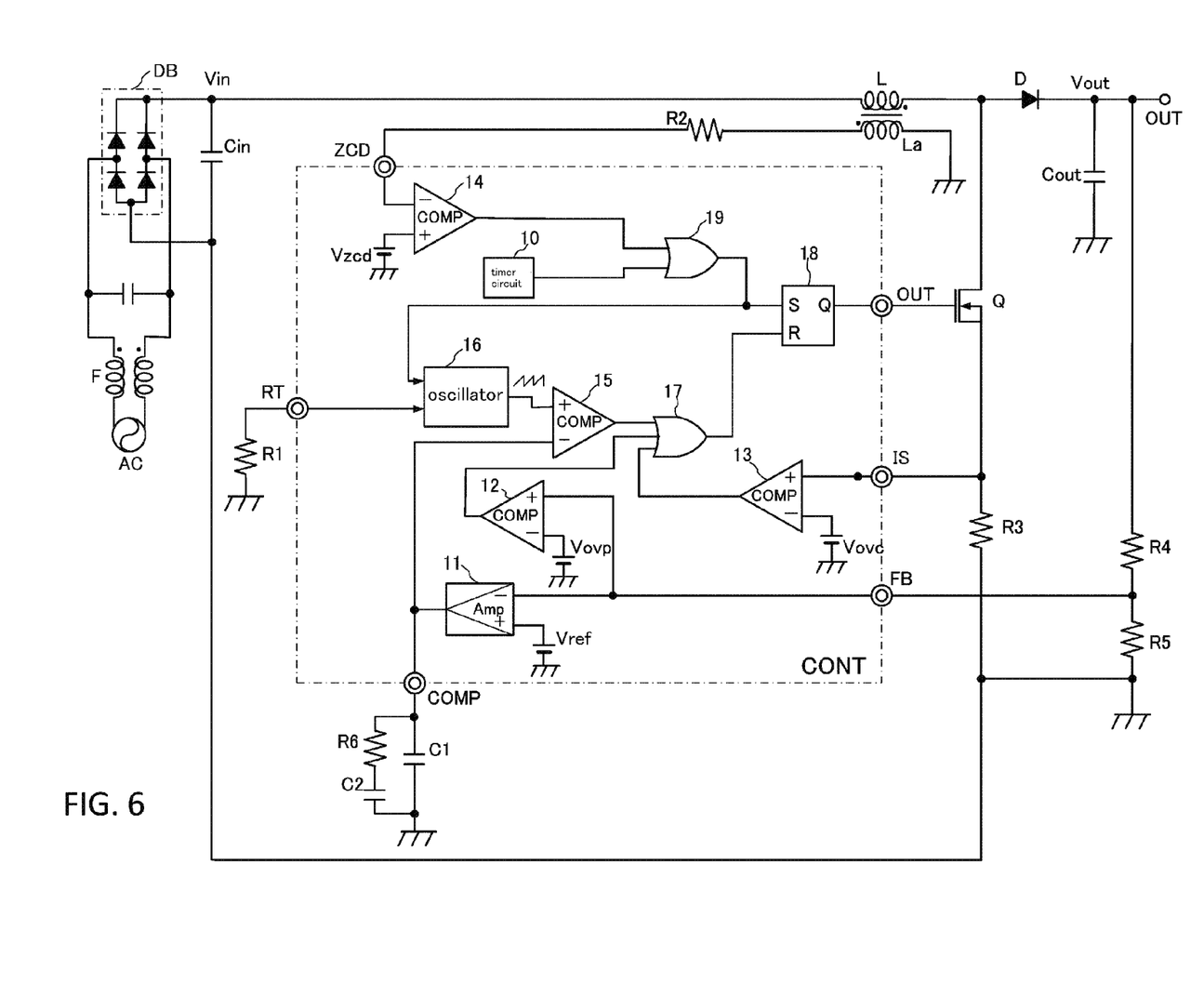
FIG. 6 shows a schematic construction of a switching power supply according to a conventional technology.

FIG. 6 shows a schematic construction of an example of a switching power supply having a power factor correction function. The switching power supply basically comprises an inductor L connected at a terminal thereof to a diode bridge circuit DB that is a rectifier circuit performing full-wave rectification of input AC voltage AC and a switching element Q connected to the other terminal of the inductor L and forming a current path from the diode bridge circuit DB through the inductor L on turning ON of the switching element Q. The switching element Q is a MOS-FET, for example.

The switching power supply further comprises a diode D connected to the other terminal of the inductor L and forming a current path from the inductor L to an output capacitor Cout on turning OFF of the switching element Q to deliver a specified output DC voltage Vout on the output capacitor Cout. The output DC voltage Vout is supplied through an output terminal OUT to an electronic device (not shown in the figure). The above described construction having a main component of the switching element Q composes the main body of a switching power supply of a booster type that obtains an output DC voltage Vout of about 400 V, for example, from AC 100 V.

The control circuit CONT, which is an integrated circuit performing various functions with a monolithic structure, conducts ON/OFF driving the switching element Q to control the current that flows through the inductor L. Specifically, the control circuit CONT receives at a terminal FB thereof a voltage Vfb that is detected through a voltage dividing resistors R4 and R5 and proportional to the output DC voltage Vout. An error detector 11 provided in the control circuit CONT generates a difference voltage between this voltage Vfb and a predetermined reference voltage Vref. The error detector 11 is a transconductance amplifier, for example. The control circuit CONT comprises a comparator 12, which is an overvoltage detector that compares the voltage Vfb received through the terminal FB with a predetermined reference voltage Vovp to detect an overvoltage.

The control circuit CONT receives at a terminal IS thereof a voltage Vis that is detected with a resistor R3 series-connected to the source terminal of the switching element Q and proportional to the current running through the switching element Q. A comparator 13, which is an overcurrent detector (or an overcurrent detecting means) provided in the control circuit CONT, compares this voltage Vis with a predetermined reference voltage Vovc to detect an overcurrent. The control circuit receives at a terminal ZCD thereof through a resistor R2 a winding voltage that is generated across an auxiliary winding La of the inductor L and corresponds to the current through the inductor L. A comparator 14, which is a zero current detector provided in the control circuit CONT, compares this winding voltage with a predetermined reference voltage Vzcd to detect a zero current.

A comparator 15, which is a PWM device or an ON width control means, compares a saw-tooth wave generated by an oscillator 16 with the error output of the error detector 11, the error output being the voltage difference between the voltage Vfb and the reference voltage Vref. This comparator 15 reverses the output thereof into an H level when the saw-tooth wave reaches the error output of the error detector 11, and thus resets a flip-flop 18 through an OR circuit 17. The flip-flop 18 is set by the output of the comparator 14 through an OR circuit 19 when the comparator 14 detects a zero current. The output through the OR circuit 19 also triggers the generation of the saw-tooth wave in the oscillator 16.

The switching element Q is ON/OFF-controlled by the output of the flip-flop 18 that is set and reset as described above. Specifically, the flip-flop 18 controls the gate voltage of the switching element Q giving a set output to a driver circuit not shown in the figure. Thus, the switching element Q is switching-driven in such a way that the switching element Q is turned ON upon setting of the flip-flop 18 and turned OFF upon resetting of the flip-flop 18.

The comparator 15 resets the flip-flop 18 corresponding to the error output of the error detector 11, thereby controlling an ON width of the switching element Q. The comparator 14 sets the flip-flop 18 upon detection of a zero current and simultaneously triggers generation of oscillation in the oscillator 16, thereby controlling ON/OFF period or a switching frequency of the switching element Q.

A resistor R1 connected to the terminal RT regulates a slope of the saw-tooth wave generated by the oscillator 16. Capacitors C1 and C2 and a resistor R6 that are connected to a terminal COMP is a phase regulation circuit for the error output of the error detector 11. The flip-flop 18 is forcedly reset through the OR circuit 17 when an overvoltage is detected by the comparator 12 or an overcurrent is detected by the comparator 13. A timer circuit 10 counts a certain time at the start of the power supply and sets the flip-flop 18 through the OR circuit 19.

In the switching power supply with the construction described above, when the magnitude of the load connected to the output terminal OUT is constant, the error output of the error detector 11 is constant and the switching element Q is switching-controlled with a constant ON width. The input voltage Vin is obtained by full-wave rectification of the input AC voltage AC through the diode bridge DB, and the voltage across the inductor L varies with the phase angle as shown by the waveform (a) in FIG. 7.

Figure 7:
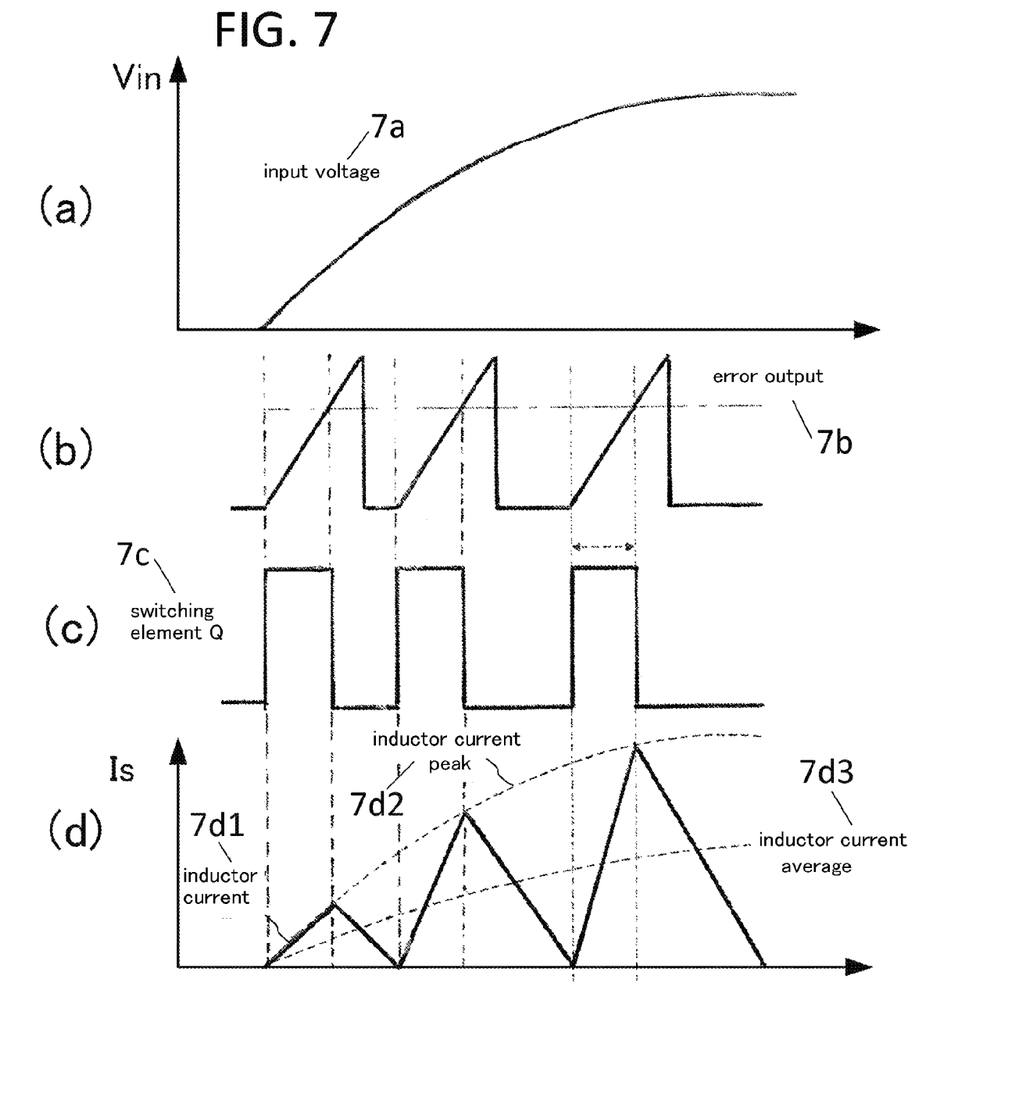
FIG. 7 shows input current through a reactor under switching control corresponding to variation of input voltage.

The waveform (b) in FIG. 7 is a saw-tooth wave generated in the oscillator 16, which is compared with the error output of the error detector 11 in the comparator 15. The comparison result ON/OFF-controls the switching element Q as shown by the waveform (c) in FIG. 7. The waveform (d) in FIG. 7 shows the current flowing through the inductor L in the ON/OFF operation of the switching element Q. It is apparent that the slope of the inductor current varies depending on the phase angle of the input voltage Vin. The envelope of the peak values of the inductor current forms an AC waveform similar to the input voltage Vin, the peak values being the inductor current at the instances of turning OFF of the switching element Q.

This causes variation in the period of time from the moment of turning OFF of the switching element Q to the moment of zero current through the inductor L. If the switching element Q would be ON/OFF-controlled with a constant period or constant frequency despite this variation, the switching element Q is turned ON under the condition of subjecting to a certain voltage on the switching element Q. Thus, the switching element Q suffers from a significant switching loss.

The zero current detection mentioned earlier detects the moment of zero current through the inductor L after turning OFF of the switching element Q. Zero current switching conducts turning ON of the switching element Q at this moment of zero current, thereby reducing the switching loss in the switching element Q caused by the variation of the peak values of the inductor current.

Patent Documents 1 and 2 disclose in detail basic construction and switching control of this type of switching power supply.

[Patent Document 1]
U.S. Pat. No. 6,984,963
[Patent Document 2]
U.S. Pat. No. 7,116,090

Figure 8:
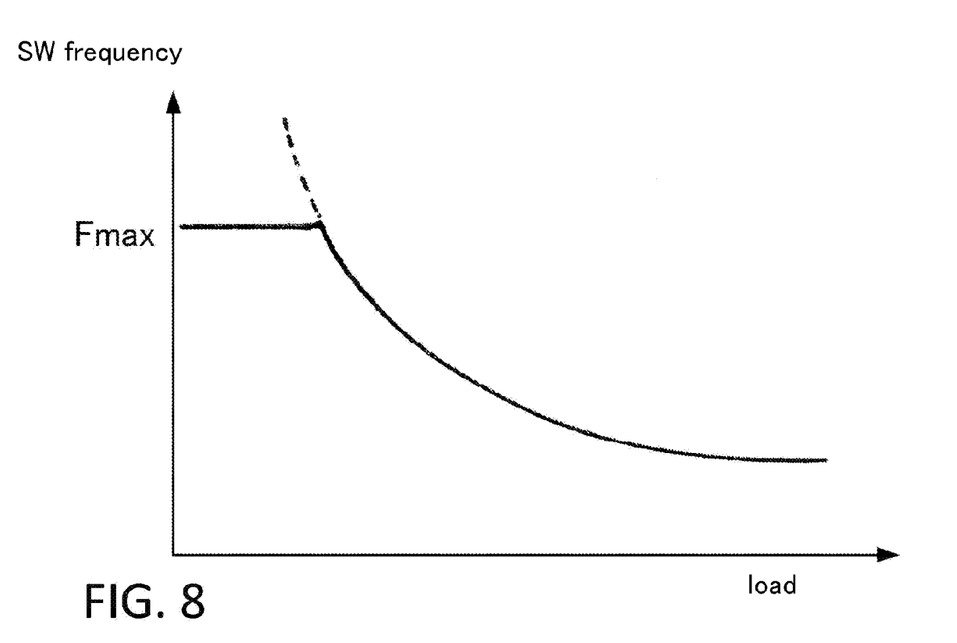
FIG. 8 shows a relationship between a load and a switching frequency.

In the switching control described above, the switching frequency Fc increases as the load becomes lighter as shown in FIG. 8. If the switching frequency Fc exceeds the operation frequency of the switching element Q, the switching loss increases. Accordingly, control is conducted to limit the maximum frequency Fmax of the switching frequency Fc as disclosed in Patent Document 2, for example. The limiting the switching frequency Fc below the maximum frequency Fmax is actually carried out by delaying the turning ON timing of the switching element Q, thereby avoiding power factor degradation.

However, there is the following problem in the power factor correction by limiting the maximum frequency of the switching frequency Fc. In the ON/OFF control of the switching element Q as described above, the magnitude of the inductor current is controlled corresponding to the phase angle of the input voltage Vin. Consequently, the inductor current is small in the region of small phase angles. When the maximum frequency limitation of the switching frequency is added under a light load condition in particular, the inductor current hardly flows in the region of small phase angle of the input voltage Vin, resulting in distortion in the input current waveform, which causes degradation of power factor in the region of small phase angles.

SUMMARY

The present invention has been made in view of this situation and an object of embodiments of the present invention is to provide a switching power supply in which the power factor in the region of small phase angle of the input voltage does not decrease even in the state with a maximum frequency limitation on the switching frequency under a light load condition.

In order to achieve the above object, a switching power supply of the present invention comprises: an inductor connected to a rectifier circuit for rectifying an input AC voltage; a switching element forming a current path from the rectifier circuit through the inductor in an ON state of the switching element; a diode forming a current path from the inductor to an output capacitor in an OFF state of the switching element to obtain a specified output DC voltage on the output capacitor; and a control circuit for controlling current through the inductor by ON/OFF controlling the switching element. The control circuit comprises an ON width controlling means or component that controls an ON width of the switching element corresponding to a voltage difference between a reference voltage and the output DC voltage; a zero current detecting means or component that detects zero current flowing through the switching element to turns ON the switching element at a timing of the zero current; a load condition detecting means or component that detects a load condition; a frequency reducing means or component that delays a turn ON timing of the switching element upon detection of a light load condition by the load condition detecting means or component to reduce a switching frequency of the switching element; and an AC period detecting means or component that detects a period of the input voltage to hold the load condition detected by the load condition detecting means or component over every period detected by the AC period detecting means or component.

Preferably, the load condition detecting means or component detects a light load condition by comparing the voltage difference between the reference voltage and the output DC voltage with preset threshold voltages.

Preferably, the frequency reducing means or component determines the turn ON timing of the switching element by counting the number of zero current detection by the zero current detecting means or component corresponding to the light load condition detected by the load condition detecting means or component.

Specifically, the frequency reducing means or component determines the turn ON timing of the switching element Q at the moment when the number of zero current detection by the zero current detecting means or component after a turning OFF of the switching element reaches a number determined corresponding to the load condition.

Preferably, the AC period detecting means or component detects the period of the input voltage by comparing a waveform that is generated by peak-holding a voltage proportional to the current through the inductor with a predetermined threshold voltage.

Preferably, the zero current detecting means or component detects a timing of zero current through the switching element from a voltage generated across an auxiliary winding of the inductor.

In the switching power supply having a construction stated above, the turn ON timing of the switching element is delayed under a light load condition. Furthermore, this state persists over every period of the input voltage so that the OFF period of the switching element is held constant over a period of the input voltage variation irrespective of the phase angle of the input voltage. Consequently, even when the switching frequency of the switching element is restricted by means of maximum frequency limitation on the switching frequency under a light load condition, the phase angle of the input current can be made in phase with the phase angle of the input voltage. Therefore, the distortion of the input current is reduced, thereby avoiding degradation in the power factor.

This controlling procedure is performed only by detecting the load condition and delay-controlling the turn ON timing with detection of the period of the input voltage. Therefore, deterioration of power factor under a light load condition is avoided in a simple and effective way.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

The following describes an example of switching power supply according to an embodiment of the present invention with reference to accompanying drawings.

Figure 1:
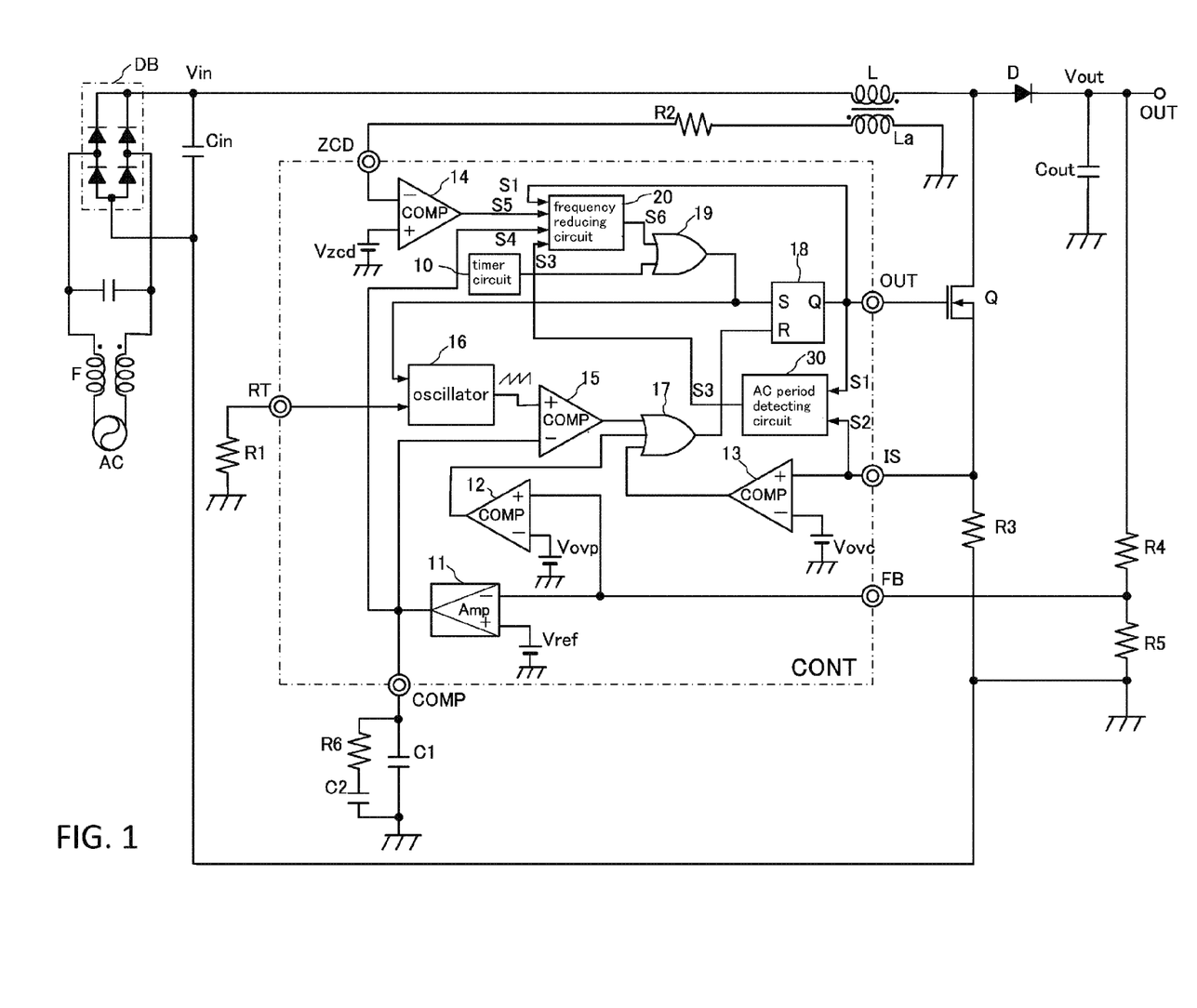
FIG. 1 shows a schematic construction of a switching power supply according to an embodiment of the present invention.

FIG. 1 shows a schematic construction of a switching power supply according to an embodiment of the present invention, which is basically similar to that of the conventional switching power supply shown in FIG. 6. The components in FIG. 1 that are the same as those of the conventional power supply of FIG. 6 are given the same symbols, and description therefor is omitted here.

The switching power supply according to this embodiment of the invention is characterized by the presence of a frequency reducing circuit 20 and an AC period detecting circuit 30. The frequency reducing circuit 20 detects a load condition and delays a turning ON timing of the switching element Q under a light load condition thereby reducing the switching frequency of the switching element Q. The AC period detecting circuit 30 detects the period of the input voltage Vin to hold throughout one period of the input voltage Vin the load condition detected in the frequency reducing circuit 20.

Figure 2:
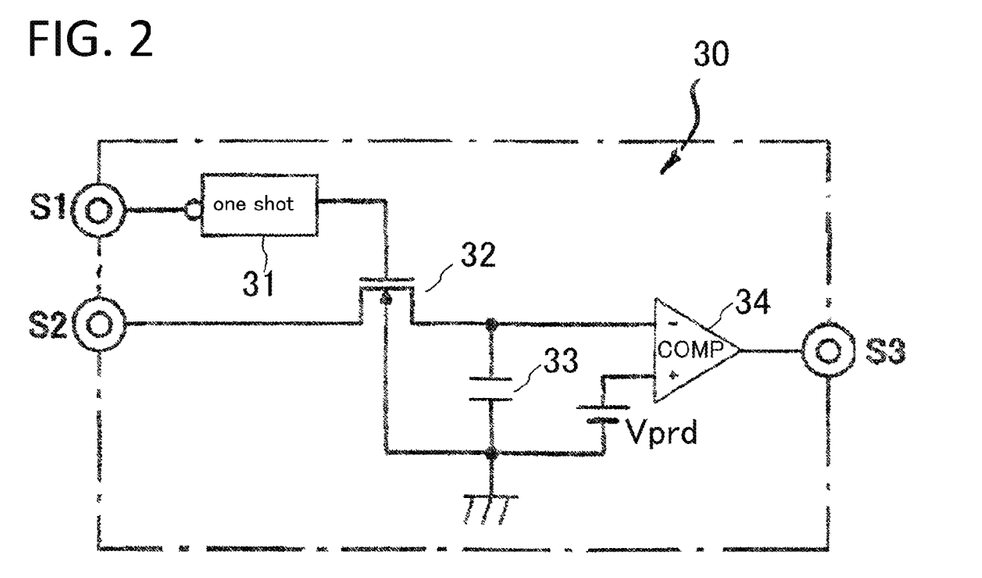
FIG. 2 shows a schematic construction of an AC period detecting circuit in the switching power supply shown in FIG. 1.

The AC period detecting circuit 30, or an AC period detecting means or component, comprises, as shown in FIG. 2, a one-shot circuit 31 that receives an output signal S1 of the flip-flop 18, the signal being an ON/OFF control signal to the switching element Q, and delivers a pulse signal at the falling down edge of the signal S1, and a switch 32 that receives the pulse signal of the one-shot circuit 31 to turn itself ON. The switch 32 is an N-channel MOS-FET, for example. The switch 32 takes in an IS current detecting voltage S2 given to the terminal IS to charge a capacitor 33. Comparing the charged voltage on the capacitor 33 with a predetermined reference voltage Vprd slightly higher than zero volts in the comparator 34, the AC frequency detecting circuit 30 detects the period of the input voltage Vin, which is a half period of the AC input voltage AC, and delivers a signal S3 that designates the period of the input voltage Vin.

Figure 3:
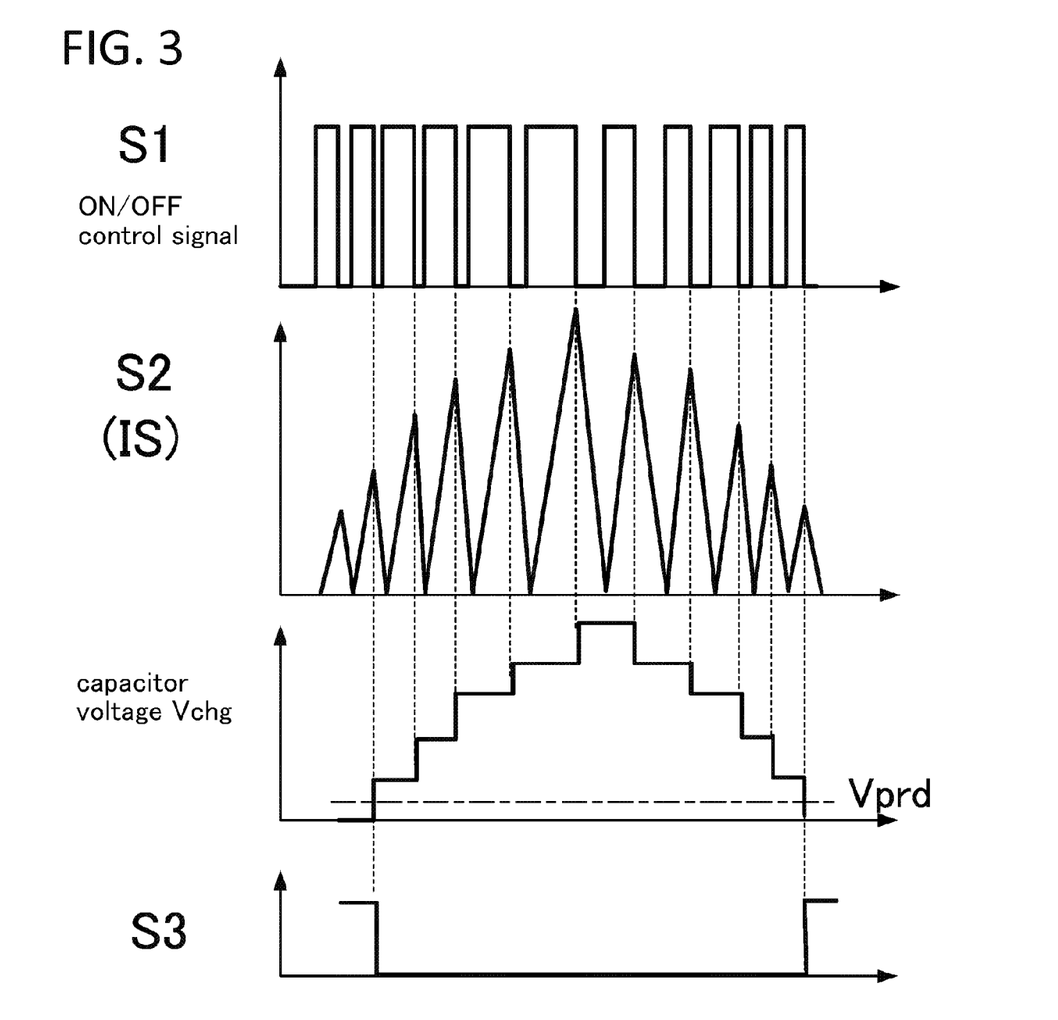
FIG. 3 shows signal waveforms illustrating operation of the AC period detecting circuit shown in FIG. 2.

As shown in FIG. 3, the AC period detecting circuit 30 turns the switch 32 ON at the falling down edge of the ON/OFF control signal S1 to detect the peak value of the IS current detecting voltage S2 and charges the capacitor 33 until the charged voltage Vchg of the capacitor 3 reaches the peak value. As a result, the charged voltage Vchg of the capacitor 3 becomes a stepwise voltage waveform changing corresponding to the phase angle of the input voltage Vin as shown in FIG. 3. By comparing the charged voltage Vchg of the capacitor 33 changing stepwise with the reference voltage Vprd in the comparator 34, the comparator 34 delivers a signal S3 with a period approximately equal to the period of the input voltage Vin.

Figure 4:
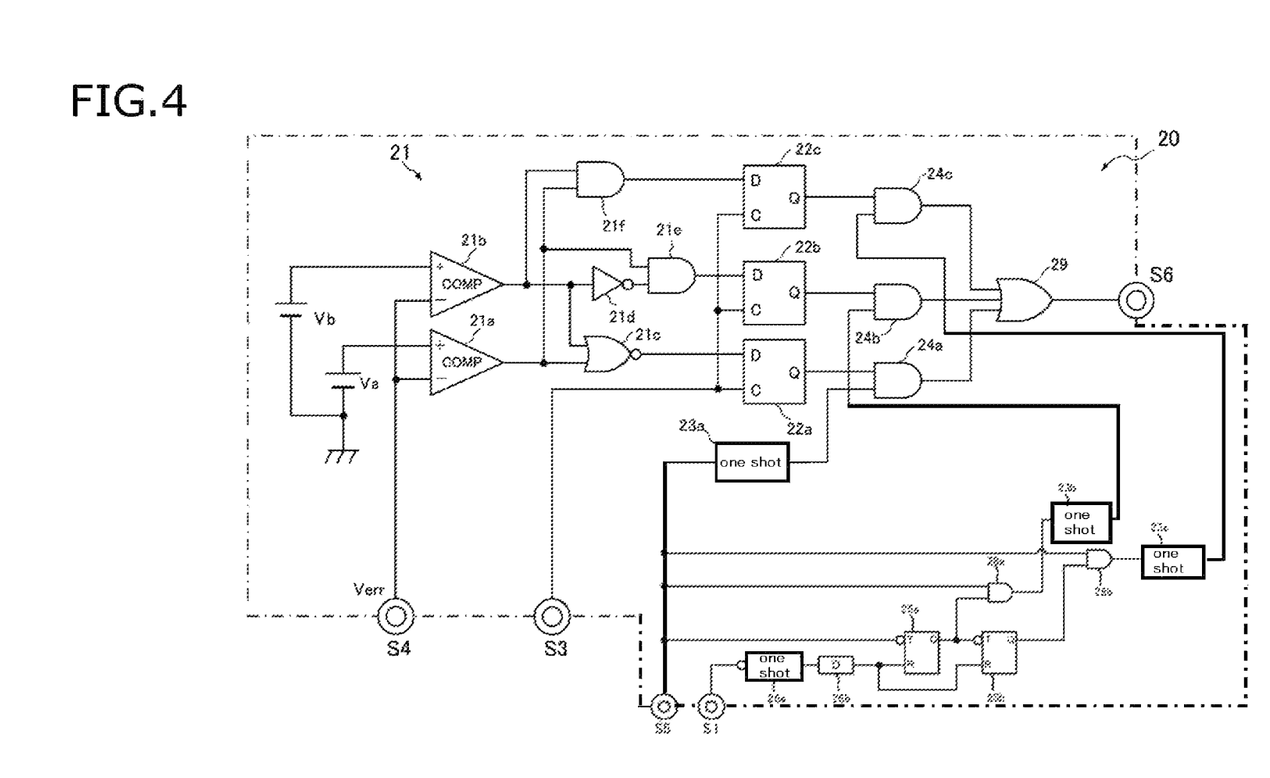
FIG. 4 shows a schematic construction of a frequency reducing circuit of the switching power supply shown in FIG. 1.

The frequency reducing circuit 20 as shown in FIG. 4 has a load condition detecting circuit 21, or a load condition detecting means or component, for detecting a load condition at the front end thereof. The load condition detecting circuit 21 comprises a first and a second comparators 21a and 21b for comparing the signal S4 designating the error output of the error detector 11 with preset threshold values Va and Vb (Va>Vb) for load condition detection. The output signals of these comparators 21a and 21b are delivered to a logic circuit composed of a NOR circuit 21c, an inverter circuit 21d, and two AND circuits 21e and 21f. The logic circuit executes logical processing and delivers load condition detection signals corresponding to a magnitude of the load.

The signal S4 designating the error output Verr of the error detector 11 increases the voltage value thereof as the load becomes heavier and decreases the voltage value thereof as the load becomes lighter. The first and second comparators 21a and 21b deliver output signals at an L level under a heavy load condition and in the state the voltage value of the signal S4 exceeds both the threshold values Va and Vb (Verr>Va>Vb). As a consequence, the output of the NOR circuit 21c is at an H level, and the outputs of the AND circuits 21e and 21f are at an L level. This state is a heavy load detection state.

When the load becomes lighter in some extent and the signal S4 decreases below the threshold value Va for load condition detection (Va≥Verr>Vb), the output of the first comparator 21a reverses into an H level, whereas the output of the second comparator 21b remains at an L level. As a consequence, the output of the NOR circuit 21c reverses into an L level, and the output of the AND circuit 21e becomes an H level, whereas the output of the AND circuit 21f remains at an L level. This state is a middle load detection state.

When the load becomes further lighter and the signal S4 falls below the threshold value Vb for load condition detection (Va>Vb≥Verr), the output of the second comparator 21b reverses into an H level, while the output of the first comparator 21a remains at an H level. As a consequence, the output of the AND circuit 21e reverses into an L level and the output of the AND circuit 21f reverses into an H level, whereas the output of the NOR circuit 21c remains at an L level. This state is a light load detection state.

The output signals thus detected and indicating the load condition delivered from the NOR circuit 21c, and AND circuits 21e and 21f are given to D flip-flops 22a, 22b, and 22c, respectively. The flip-flops 22a, 22b, and 22c take in the output signals from the NOR circuit 21c, and the AND circuits 21e and 21f upon receiving the output signal S3 of the AC period detecting circuit 30. Because the output signal S3 persists over one period of the input signal Vin, which is a half period of the AC input voltage AC, the flip-flops 22a, 22b, and 22c hold the signals indicating the load condition as described above over one period of the input signal Vin.

The frequency reducing circuit 20 comprises, in addition to the load condition detecting circuit 21, a delay control circuit 23 that delay-controls the turn ON timing of the switching element Q according to the load condition information held in the flip-flops 22a, 22b, and 22c. The delay control circuit 23 generates gate control signals at different timings according to the output signal S1 of the flip-flop 18 ON/OFF driving the switching element Q and to the output signal S5 delivered by the comparator 14, which is a zero current detecting means or component, upon detecting a zero current. The gate control signals alternatively activate the AND circuits 24a, 24b, 24c provided downstream the flip-flops 22a, 22b, and 22c, respectively.

The delay control circuit 23 comprises a first one-shot circuit 23a that is triggered by the output signal S5 of the comparator 14 and activates the AND circuit 24a. The AND circuit 24a is alternatively activated by the output of the first one-shot circuit 23a. The output signal S5 is delivered to the toggle terminal of a toggle flip-flop circuit 25a and also to an AND circuit 28a and 28b. The output signal S1 is delivered to a one-shot circuit 26a. This one-shot circuit 26a is triggered by a falling down edge of the output signal S1. The output of the one-shot circuit 26a is delivered through a delay circuit 26b to the reset terminal of the toggle flip-flop circuit 25a and 25b. As a consequence, the toggle flip-flops 25a and 25b are reset when the switching element Q turns OFF. Thus, the current running through the switching element Q becomes zero and a rising up timing of the signal S5 is correctly counted. After the current through the switching element Q becomes zero in the next switching cycle, at the first falling edge of S5, the output Q of the toggle flip-flop 25a becomes an H level. Because the output Q of the toggle flip-flop 25a is an H level, at the second rising edge of S5, the AND circuit 28a is activated. The one-shot circuit 23b is triggered by the rising edge of the AND circuit 28a. The output of this second one-shot circuit 23b alternatively activates the AND circuit 24b. In this way, the output of the AND circuit 24b becomes an H level at the second rising edge of S5.

The output signal S5 is given to an AND circuit 28b as well. This AND circuit 28b triggers a third one-shot circuit 23c when the output of the flip-flop circuit 25b is at an H level and the output signal S5 is at an H level. After the output Q of the toggle flip-flop 25a becomes high level at the first falling edge of S5, the output Q of the toggle flip-flop 25a becomes low level at the second falling edge of S5. The output Q of the toggle flip-flop 25b becomes high level when the output Q of the toggle flip-flop 25a becomes low level. The output of the AND circuit 28b becomes high level at the third rising edge of S5, because the output Q of the toggle flip-flop 25b is high level after second falling edge of S5. The output of the third one-shot circuit 23c alternatively activates the AND circuit 24c in place of the AND circuits 24a and 24b when the output of the AND circuit 28b is high. In this way, the output of the AND circuit 24c becomes an H level at the third rising edge of S5.

Thus, the AND circuits 24a, 24b, and 24c are sequentially and alternatively activated receiving the output signals of the one-shot circuits 23a, 23b, and 23c in the delay control circuit 23 having above-described construction at timings according to the signals S1 and S5. The output of the flip-flop circuits 22a, 22b, and 22c are taken out through the AND circuits 24a, 24b, and 24c, the output of which are delivered through an OR circuit 29 as a signal S6 for controlling the turn ON timing of the switching element Q.

Figure 5:
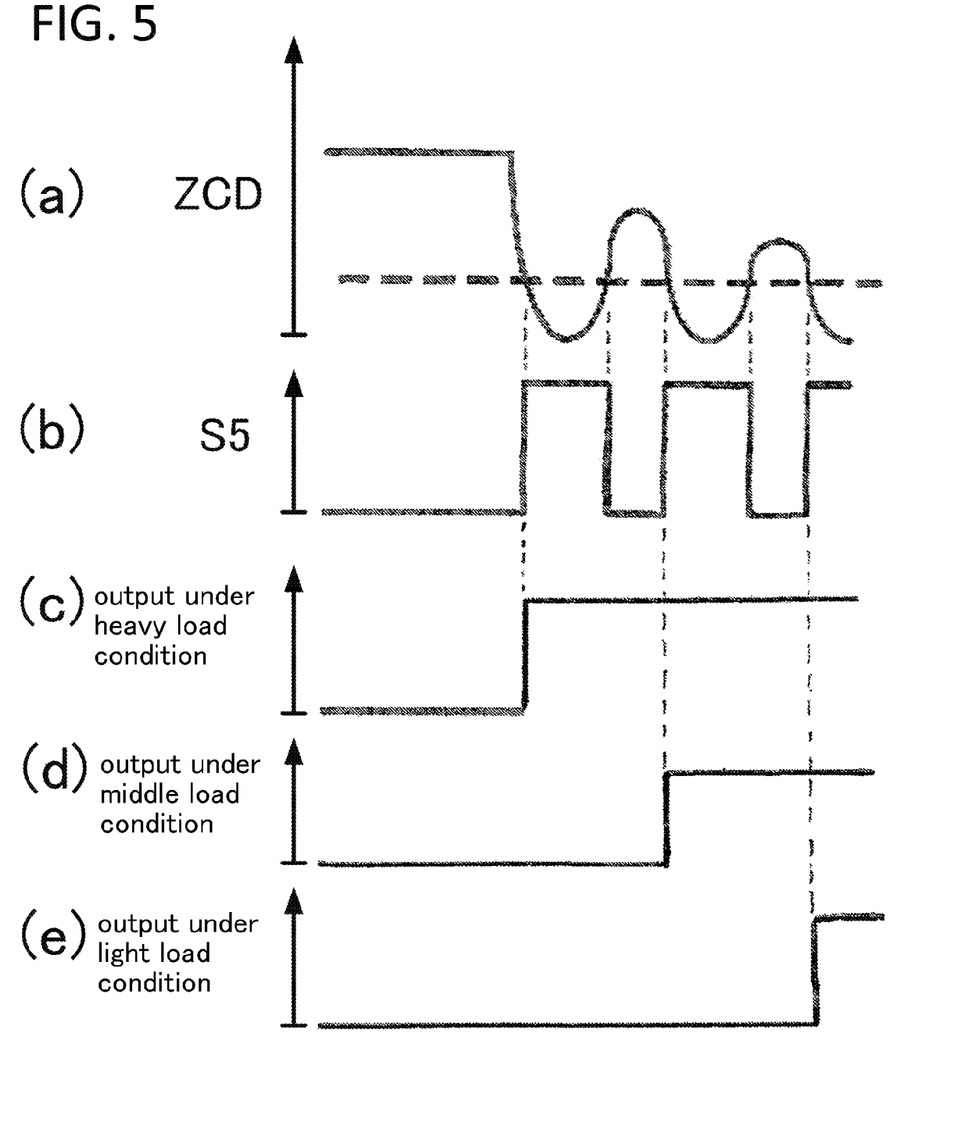
FIG. 5 shows signal waveforms illustrating operation of the frequency reducing circuit shown in FIG. 4.

In operation of the frequency reducing circuit 20 having the above-described construction and shown by the waveforms in FIG. 5, the AND circuits 24a, 24b, and 24c are sequentially and alternatively activated according to the signal S5 that is delivered upon detection of the zero volts by the comparator 14 from the winding voltage having the waveform (a) in FIG. 5 given to the terminal ZCD. More specifically, at the first rising up timing of the signal S5, the AND circuit 24a becomes active; at the second rising up timing of the signal S5, the second AND circuit 24b becomes active; and at the third rising up timing, the third AND circuit 24c becomes active alternatively in this sequence.

Under a heavy load condition, since the flip-flop circuit 22a is set as described previously, the output of the flip-flop circuit 22a is delivered as the signal S6 for controlling the turn ON timing of the switching element Q in synchronous with the first rising up timing of the signal S5 as shown by the waveform (c) in FIG. 5. When the load is somewhat light, since the flip-flop circuit 22b is set as described previously, the output of the flip-flop circuit 22b is delivered as the signal S6 in synchronous with the second rising up timing of the signal S5 as shown by the waveform (d) in FIG. 5. When the load becomes further lighter, the output of the flip-flop circuit 22c is delivered as the signal S6 in synchronous with the third rising up timing of the signal S5 as shown by the waveform (e) in FIG. 5.

Thus, the output timing of the signal S6 for controlling the turn ON timing of the switching element Q changes according to the magnitude of the load; a light load condition delays the output timing. In addition, the output timing of the signal S6 persists over one period of the input voltage Vin, which is a half period of the input AC voltage, by means or component of the flip-flop circuits 22a, 22b, and 22c, setting operation of which is controlled by the signal S3 with a duration approximately equal to the period of the input voltage Vin.

In other words, with an ordinary load, which is a heavy load, the switching element Q is turned ON at the timing of zero voltage detection by the comparator 14; with a load lighter in some extent, the switching element Q is turned ON at the delayed timings of second zero voltage detection by the comparator 14 over one period of the input voltage Vin. With a much lighter load, the switching element Q is turned ON at the more delayed timing of third zero voltage detection by the comparator 14. Delaying control of the turn ON timing of the switching element Q in such a way performs reducing control of the switching frequency of the switching element Q under light load conditions.

A switching power supply according to an embodiment of the invention that performs delaying control of the turn ON timing of the switching element Q corresponding to the magnitude of the load elongates the turn OFF period of the switching element Q under a light load condition to lower the switching frequency. Thus, switching efficiency is improved. Because the delaying control of the turn ON timing persists over one period of the input voltage Vin, a frequency reduction effect is obtained around the peak of the phase angle of the input voltage Vin as well as around the bottom of the phase angle of the input voltage. Thus, the distortion in the input current is avoided and the input current is effectively switched. Therefore, deterioration in power factor is effectively avoided.

The present invention is not limited to the embodiment described thus far. For example, while the period of the input voltage Vin is detected from the current IS in the above-described embodiment, it is of course possible to detect the period by directly monitoring the input voltage Vin. While the load condition is detected in three different classes in the above-described embodiment, it is possible to detect in two, four or more deferent classes. It is of course preferable to regulate the turn ON timing of the switching element Q in accordance with the zero current detection by the comparator 14. The present invention can be modified without departing from the spirit and scope of the invention.

REFERENCE SIGNS OR NUMERALS

Q: switching element
L: inductor

D: diode
CONT: controller that is a control IC
11: error detector
12: comparator for overvoltage detection
13: comparator for overcurrent detection
14: comparator for zero current detection
15: comparator for pulse width modulation
16: oscillator
18: flip-flop circuit
20: frequency reducing circuit
21a, 21b: comparator for load condition detection
21c NOR circuit
21d: inverter
21e, 21f: AND circuit
22a, 22b, 22c: flip-flop circuit for load condition holding
23: delay control circuit
24a, 24b, 24c: AND circuit
25a, 25b: toggle flip-flop
26a: one-shot circuit
26b: delay circuit
28a, 28b: AND circuit
29: OR circuit
30: AC period detecting circuit
31: one-shot circuit
32: switch
33: capacitor
34: comparator

What is claimed is:

1. A switching power supply comprising:
an inductor connected to a rectifier circuit that rectifies an input AC voltage;
a switching element forming a current path from the rectifier circuit through the inductor in an ON state of the switching element;
a diode forming a current path from the inductor to an output capacitor in an OFF state of the switching element to obtain a specified output DC voltage on the output capacitor; and
a control circuit that controls current through the inductor by ON/OFF controlling the switching element, the control circuit comprising
an ON width controlling component that controls an ON width of the switching element corresponding to a voltage difference between a reference voltage and the output DC voltage,
a zero current detecting component that detects zero current flowing through the switching element and a controlling circuitry that turns ON the switching element at a timing of the detected zero current,
a load condition detecting component that detects a load condition;
a frequency reducing component that delays a turn ON timing of the switching element upon detection of a light load condition by the load condition detecting component to reduce a switching frequency of the switching element, and
an AC period detecting component that detects a period of the input voltage and a circuitry to hold the load condition detected by the load condition detecting component over every period detected by the AC period detecting.

2. The switching power supply according to claim 1, wherein the load condition detecting component detects a light load condition by comparing the voltage difference between the reference voltage and the output DC voltage with preset threshold voltages.

3. The switching power supply according to claim 1, wherein the frequency reducing component determines the turn ON timing of the switching element by counting the number of zero currents detected by the zero current detecting component corresponding to the light load condition detected by the load condition detecting component.

4. The switching power supply according to claim 3, wherein the frequency reducing component determines the turn ON timing of the switching element Q at the moment when the number of zero current detection by the zero current detecting component after a turning OFF of the switching element reaches a number determined corresponding to the load condition.

5. The switching power supply according to claim 1, wherein the AC period detecting component detects the period of the input voltage by comparing a waveform that is generated by peak-holding a voltage proportional to the current through the inductor with a predetermined threshold voltage.

6. The switching power supply according to claim 1, wherein the zero current detecting component detects a timing of zero current through the switching element from a voltage generated across an auxiliary winding of the inductor.

* * * * *

UNITED STATES PATENT AND TRADEMARK OFFICE
CERTIFICATE OF CORRECTION

| | | |
|---|---|---|
| PATENT NO. | : 9,099,925 B2 | Page 1 of 1 |
| APPLICATION NO. | : 14/029546 | |
| DATED | : August 4, 2015 | |
| INVENTOR(S) | : Takato Sugawara | |

It is certified that error appears in the above-identified patent and that said Letters Patent is hereby corrected as shown below:

On the title page under item (56),

Second Column, OTHER PUBLICATIONS, Line 1

Delete "Condcution" and insert --Conduction--, therefor.

In the claims,

Claim 4, Column 10, Line 31

Delete "zero current detection" and insert --zero currents detected--, therefor.

Signed and Sealed this
Twenty-fourth Day of November, 2015

Michelle K. Lee
*Director of the United States Patent and Trademark Office*